United States Patent [19]

Buxbaum

[11] 4,171,421

[45] Oct. 16, 1979

[54] THERMOPLASTIC COPOLYESTERS

[75] Inventor: Lothar Buxbaum, Lindenfels, Fed. Rep. of Germany

[73] Assignee: Ciba-Geigy Corporation, Ardsley, N.Y.

[21] Appl. No.: 836,938

[22] Filed: Sep. 27, 1977

[30] Foreign Application Priority Data

Oct. 7, 1976 [CH] Switzerland ............... 12700/76

[51] Int. Cl.$^2$ ........................................... C08G 63/18
[52] U.S. Cl. ............................. 528/194; 528/173; 528/191; 528/192; 528/193
[58] Field of Search ............ 260/47 C; 528/173, 191, 528/192, 193, 194

[56] References Cited

U.S. PATENT DOCUMENTS

| 2,035,578 | 3/1936 | Wagner | 260/2 |
|---|---|---|---|
| 3,220,977 | 11/1965 | Jackson, Jr. et al. | 260/47 |
| 3,511,808 | 5/1970 | Hodge et al. | 260/47 |
| 3,704,279 | 11/1972 | Ismail | 260/61 |

*Primary Examiner*—Lester L. Lee
*Attorney, Agent, or Firm*—Luther A. R. Hall

[57] ABSTRACT

Linear thermoplastic polyesters obtained from aromatic dicarboxylic acids and unsubstituted aromatic diols are modified with relatively long chain aliphatic dicarboxylic acids. By this means, the processing temperatures are lowered, while the mechanical properties remain essentially unchanged.

10 Claims, No Drawings

THERMOPLASTIC COPOLYESTERS

The present invention relates to linear thermoplastic copolyesters obtained from aromatic and higher aliphatic dicarboxylic acids and unsubstituted bisphenols, processes for their preparation and their use.

Thermoplastic polyesters obtained from dicarboxylic acids and aromatic diols, for example polyesters which are obtained from aliphatic and/or aromatic dicarboxylic acids and bisphenols and which can also contain aliphatic diols, are known. They are described, for example, in U.S. Pat. Nos. 3,351,624, 3,317,464, 3,297,633 and 3,471,441 and in German Offenlegungsschrift No. 2,438,053. A substantial disadvantage of these polyesters is that they are difficult to process because of high softening points and melt viscosities, which requires processing temperatures which can be at the limit of the stability to heat of the polyesters. The latter applies especially for the polyesters obtained from phthalic acids and bisphenols. The avoidance of this disadvantage by the use of alkylated bisphenols, by which means a lowering in the melt viscosities of the polyesters is achieved, is described in U.S. Pat. No. 3,398,120. This proposal has the disadvantage that uneconomic alkylated bisphenols have to be used.

The object of the present invention is to provide thermoplastic polyesters which are obtained from unsubstituted bisphenols and, in the main, aromatic dicarboxylic acids, have lowered melt viscosities and can be processed at relatively low temperatures without problems to give shaped articles. The mechanical properties of the mouldings, for example the glass transition temperature, the heat distortion point, the flexural strength and the modulus of elasticity, should be only slightly impaired in these polyesters, and the electrical insulating properties (determined by the tracking resistance and the arcing resistance) should be improved.

The present invention relates to linear thermoplastic copolyesters which have a relative viscosity of at least 1.3, measured on a solution of 1 g of polyester in 100 ml of a solvent consisting of equal parts of phenol and symmetrical tetrachloroethane at 30° C., and consist, relative to the polyester, of (a) 49.5 to 45 mol % of at least one aromatic dicarboxylic acid and (b) 50 mol % of at least one bisphenol of the general formula I

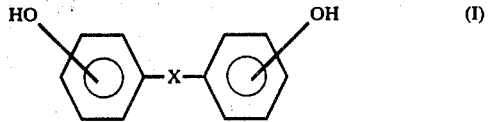

in which the OH groups are bonded in the m-position or p-position and X is a direct bond, O, S or $SO_2$ or substituted or unsubstituted alkylidene, cycloalkylidene or alkylene, wherein (c) 0.5 to 5 mol % of one or more linear or branched aliphatic dicarboxylic acids having 6 to 24 C atoms have been co-condensed as the modifying component.

The relative viscosity is preferably 1.5 to 3.5.

Examples of suitable aromatic dicarboxylic acids are: terephthalic acid, isophthalic acid, o-phthalic acid, 1,3-, 1,4-, 2,6- or 2,7-naphthalenedicarboxylic acid, 4,4'-diphenyldicarboxylic acid, 4,4'-diphenylsulphone-dicarboxylic acid, 1,1,3-trimethyl-5-carboxy-3-(p-carboxyphenyl)-indane, 4,4'-diphenyl ether-dicarboxylic acid, bis-p-(carboxyphenyl)-methane and stilbenedicarboxylic acid.

Preferred acids amongst the aromatic dicarboxylic acids are, especially, terephthalic acid and isophthalic acid, and also orthophthalic acid. Mixtures of terephthalic acid and isophthalic acid, which in particular contain, relative to these aromatic dicarboxylic acids, 30 to 70 mol % of terephthalic acid and 70 to 30 mol % of isophthalic acid, are particularly preferred.

In the bisphenols of the formula I, the OH groups are, in particular, bonded in the p-position. Some preferred groups X are, in addition to O, S and $SO_2$, for example: ethylidene, 1,1- or 2,2-propylidene, 2,2-butylidene, 1,1-isobutylidene, pentylidene, hexylidene, heptylidene, octylidene, dichloroethylidene and trichloroethylidene, as substituted or unsubstituted alkylidene, methylene, ethylene, phenylmethylene, diphenylmethylene and methylphenylmethylene, as substituted or unsubstituted alkylene, or cyclopentylidene, cyclohexylidene, cycloheptylidene and cyclooctylidene, as cycloalkylidene.

Examples of bisphenols are: bis-(p-hydroxyphenyl) ether or bis-(p-hydroxyphenyl) thioether, bis-(p-hydroxyphenyl)sulphone, bis-(p-hydroxyphenyl)-methane, 1,2-bis-(p-hydroxyphenyl)-ethane, phenyl-bis-(p-hydroxyphenyl)-methane, diphenyl-bis-(p-hydroxyphenyl)-methane, 1,1-bis-(4'-hydroxyphenyl)-ethane, 1,1- or 2,2-bis-(p-hydroxyphenyl)-butane, 1,1-dichloro- or 1,1,1-trichloro-2,2-bis-(p-hydroxyphenyl)-ethane, 1,1-bis-(p-hydroxyphenyl)-cyclopentane and, especially 2,2-bis-(p-hydroxyphenyl)-propane (bisphenol A) and 1,1-bis-(p-hydroxyphenyl)-cyclohexane (bisphenol C).

The aliphatic dicarboxylic acid (c) preferably contains 8 to 22 C atoms. Examples of the dicarboxylic acid (c) are: adipic acid, pimelic acid, suberic acid, azelaic acid, sebacic acid, trimethyladipic acid, t.-butyladipic acid, tetradecanedicarboxylic acid, octadecanedicarboxylic acid and alkylated malonic or succinic acid having, preferably, 5 to 20 C atoms in the alkyl, for example decyl-, dodecyl- or eicosyl-malonic or -succinic acid.

The polyesters according to the invention can be obtained according to a known method by subjecting the dicarboxylic acids (a) and (c), or their polyester-forming derivatives, to a polycondensation reaction with at least one bisphenol, or its polyester-forming derivatives, until the desired viscosity is reached. As a rule, the polycondensation reaction is carried out at temperatures of 0° to 320° C. and under normal pressure, in vacuo and/or in a stream of inert gas. The possible embodiments of this process are described in J. Goodman, Polyesters, Volume 1, American Elsevier Publ. Co. (1965).

The known methods for the preparation of the novel polyesters are, for example, solution condensation or azeotropic condensation, interfacial condensation, melt condensation or solid phase condensation, including in thin layers, as well as combinations of these methods, depending on which polyester-forming derivatives and reaction catalysts are used.

Polyester-forming derivatives of the dicarboxylic acids which are used are, preferably, the diaryl esters. In principle, any desired diaryl esters can be used, in the main the diphenyl esters of isophthalic acid and terephthalic acid. However, it is also possible to use diaryl esters of substituted phenols, thus, for example, dicresyl esters, esters of butylphenols or esters of halogenated phenols. For particular special processes, the free dicarboxylic acids or the acid dihalides are used. The bisphenols are employed as such or in the form of diesters with low-molecular carboxylic acids, for example the diacetates.

The polyesters according to the invention are preferably prepared from the diphenyl esters of the dicarboxylic acids (a), the free bisphenols and the free dicarboxylic acids (c). The starting components are reacted in an inert atmosphere, for example nitrogen or argon, and in the presence of catalysts by a melt condensation process and transesterification process, which are known per se; i.e. the diaryl ester, the bisphenol and the dicarboxylic acid (c) are introduced into a suitable reaction vessel, such as a stirred reactor or a stirred thin film reactor, and, after adding catalysts and, if appropriate, stabilisers, the mixture is warmed to the reaction temperature, which in general is between 180° C. and 320° C. The final part of the reaction is carried out in vacuo, until the polycondensation product has the desired viscosity. After it has been removed from the reaction vessel and cooled, the resulting polyester melt is comminuted in a conventional manner. The diaryl ester of the aromatic dicarboxylic acid and the bisphenol are used in stoichiometric ratios, although each component, and preferably the diaryl ester, can be present in an excess of up to 20% and preferably of up to 5%. The total amount of each component can also be added in portions in the course of the polycondensation reaction. A proportion (up to 20 mol % of the total amount) of the diphenyl ester can also be replaced by diphenyl carbonate.

The transesterification catalysts and polycondensation catalysts used are known and can be used in the case of the present invention. Examples of such catalysts comprise the alkali metals and alkaline earth metals, magnesium, lead, zinc, antimony, titanium and tin in the form of their compounds, for example in the form of phenolates, oxides, alkoxides, hydrides, borohydrides and alcoholates. Lithium, potassium and sodium are particularly preferred catalysts.

Stabilisers which can be used are the compounds known for polycondensation reactions, thus, for example, aryl phosphites, alkyl phosphites and mixed alkyl-/aryl phosphites and corresponding phosphates.

Another embodiment for the preparation of the novel polyesters consists in subjecting dihalides of the dicarboxylic acids (a) and (c), preferably the acid dichlorides, to a polycondensation reaction with bisphenols in the presence of a basic catalyst, in the temperature range to 0° to 100° C., with the elimination of hydrogen halide. The basic catalysts used are preferably amines or quaternary ammonium salts. The proportion of basic catalyst can be from 0.1 to 800 mol % and more, and preferably 0.1 to 100 mol %, relative to the acid halides. This procedure can be carried out without a solvent or in the presence of a solvent. It can be carried out in homogeneous solution in organic solvents, or as an interfacial condensation in a water/organic solvent system.

The polycondensation reaction can also be carried out by first subjecting the starting compounds to a condensation reaction in the melt until a certain viscosity is reached, then comminuting or granulating the precondensate prepared in this way, for example with the aid of an underwater granulator, drying the granules, crystallising them, if desired, using crystallisation auxiliaries and then subjecting them to a solid phase condensation reaction, for which vaccum and temperatures below the melting point of the granules are employed. Higher viscosities can be achieved by this means.

The post-condensation can also be carried out in the melt, and in this case an extruder suitable for such reactions, for example a twin-screw extruder, or a twin-screw kneader, can advantageously be used.

In another embodiment the procedure can also be that a precondensate of the dicarboxylic acids (a), or their polyester-forming derivatives, and the bisphenols and a precondensate of the dicarboxylic acids (c), or their polyester-forming derivatives, and the bisphenols are prepared separately and these two precondensates are mixed in the melt and then subjected to a polycondensation reaction in the melt or in the solid phase, until the desired viscosity is reached. Predominantly block polycondensation products, in which the polyester chains contain segments of the precondensates, are obtained by this means.

Inert additives of all types, such as fillers or reinforcing fillers, such as talc, kaolin, metal powders, wollastonite and, especially, glass fibres, inorganic or organic pigments, optical brighteners, delustering agents, mould release agents, agents which promote crystallisation, flameproofing agents or stabilisers against thermal degradation, can be added to the reaction mass during working up of the polyester melt or even prior to the polycondensation reaction.

If the polycondensation reaction is carried out discontinuously, the inert additives can even be added during the final condensation steps, for example during the solid phase condensation reaction or at the end of the melt condensation.

The polyesters according to the invention are amorphous and transparent, depending on which diols and which dicarboxylic acids are used as the starting components and the ratios in which these are employed. They are colourless to brown coloured and soluble in organic solvents and are thermoplastic materials (engineering plastics), from which mouldings having valuable properties can be produced by the conventional shaping processes, such as casting, injecting moulding and extruding. Examples of such mouldings are components for technical equipment, apparatus casings, household equipment, sports equipment, electrical insulations, car components, circuits, sheets, films, fibres and semi-finished products which can be shaped by machining. It is also possible to use the polyesters for coating articles by known powder-coating processes, and lacquer-coating using a spreadable solution of the polyester is also possible. Furthermore, the polyesters according to the invention are also suitable as hot-melt adhesives, for the production of sintered filters and for the production of machine parts by the sinter-welding process.

The polyesters according to the invention show a surprisingly great reduction in the melt viscosity, coupled with only a slight change in the mechanical properties, and this ensures processing at relatively low temperatures with fewer problems than in the case of the polyesters obtained from aromatic dicarboxylic acids and unsubstituted bisphenols. The electrical insulating properties of the polyesters according to the invention are surprisingly considerably better.

The polyesters prepared according to the examples which follow are characterised in more detail by the following identifying data. The polyesters are characterised by those morphological changes which are measured by means of differential thermal analysis on a sample which has been heat-treated at 30° C. above the melting point or softening point for 3 minutes and then rapidly chilled. The chilled sample is heated at a heating rate of 16° C./minute by means of a "DSC-1B" differential scanning calorimeter from Messrs. Perkin-Elmer. The thermogram of the sample shows the glass transition temperature ($T_g$), the crystallisation temperature ($T_c$) and the crystallite melting point ($T_m$).

The glass transition temperature is given as the turning point at the sudden increase in the specific heat in the thermogram, the crystallisation temperature is given as the apex of the exothermic peak, the melting point is given as the apex of the endothermic peak and the decomposition temperature ($T_d$) is given as that point at which the sudden exothermic and endothermic variations in the specific heat start. The relative viscosity of the polycondensation products of the examples is determined on solutions of 1 g of polyester in 100 ml of a mixture consisting of equal parts of phenol and symmetrical tetrachloroethane, at 30° C. The softening point ($T_s$) is determined on a Kofler heated stage microscope at a heating rate of 15° C./minute, a cross being formed from 2 filaments and the softening point being designated as that temperature at which the sharp angles of the cross disappear. The examples which follow serve to illustrate the invention further.

EXAMPLE 1

Diphenyl terephthalate, diphenyl isophthalate, bisphenol A (see the table for the molar ratios) and 0.01% of titanium (relative to the sum of the acids) in the form of the tetraisopropylate are melted together in a 10 l reactor fitted with a stirrer, a N₂ inlet and a distillation bridge, and the melt is slowly brought to 250° C. After the evolution of phenol has started, the temperature is raised to 280° C. and 60 to 80% of the theoretical amount of phenol is distilled off in the course of about 60 minutes.

At this time, the molar amount, indicated in the table, of an aliphatic dicarboxylic acid is added, and after a further 15 minutes a vacuum of about 0.5 mm Hg is slowly applied. The reaction is discontinued 30 minutes after the full vacuum has been reached.

The precondensate obtained in this way is powdered, spread out in a thin layer on Teflon-coated sheet metal and subjected to a further condensation reaction in a vacuum drying cabinet at 220° C. and under 0.2 mm Hg for 48 hours. For comparison, a polyester is prepared from diphenyl terephthalate, diphenyl isophthalate and bisphenol A.

The end products are processed into test pieces using an injection moulding machine and the properties indicated in the table are determined:

TABLE

| Composition | | Molar ratio | |
|---|---|---|---|
| Terephthalic acid + isophthalic acid + bisphenol A + sebacic acid | | 0.285:0.185:0.5:0.03 | |
| Terephthalic acid + isophthalic acid + bisphenol A (comparison example) | | | 0.3:0.2:0.5 |
| $\eta_{rel}$(polymer) | | 1.89 | 1.71 |
| $\eta_{rel}$(test piece) | | 1.63 | 1.69 |
| Processing temperatures (°C.) | | 240/250 | 330/340 |
| Mechanical properties | Specification | | |
| Flexural strength (kp/cm²) | DIN 53,452 NKS | 1,075 | 1,010 |
| Modulus of elasticity from a bending test (kp/cm²) | ASTM D 790 | 18,300 | 22,000 |
| Impact strength (cmkp/cm²) | DIN 53,453 NKS | no break | no break |
| Notched impact strength (cmkp/cm²) | DIN 53,453 NKS | 5 | 11 |
| Heat distortion point (°C.) | ISO/R 75 PS A | 144 | 160 |
| Glass transition temperature (°C.) | DSC | 169 | 190 |
| Arcing resistance (seconds) | ASTM D 495 | 17.5 | 7 |
| Tracking resistance | DIN 53,480 KC | 250 | 100 |
| Example No. | | 1 | comparison |

EXAMPLES 2-8

The polyesters listed in the table which follows are prepared, analogously to Example 1, in a 200 ml glass reactor fitted with a stirrer, a N₂ inlet and a distillation head with a condenser, the batch size being between 10 and 50 g.

In Examples 6-8, the procedure of the known acid replacement process is followed, and for this process the free acids and the bisphenol in the form of the diacetate are employed. 0.05 g of magnesium are employed as the catalyst. Acetic acid distils off. In other respects, the procedure in this case also is analogous to Example 1.

A post-condensation in a thin layer is not carried out, but is possible.

| Example No. | Composition | Molar ratio | $\eta_{rel}$ | $T_g$(°C.) | $T_s$(°C.) |
|---|---|---|---|---|---|
| 2 | DPT + DPI + sebacic acid + bisphenol C | 0.3:0.19:0.01:0.5 | 1.16 | 150 | 165 |
| 3 | DPT + DPI + azelaic acid + dihydroxydiphenylsulphone | 0.3:0.195:0.005:0.5 | 1.06 | 148 | — |
| 4 | DPT + DPI + azelaic acid + methylenedixylenol | 0.3:0.19:0.01:0.5 | 1.25 | 173 | 170 |
| 5 | DPT + DPI + azelaic acid + BPA + tetrabromo-BPA | 0.3:0.17:0.03:0.45:0.05 | 1.21 | 169 | 100 |
| 6 | IPA + diphenylsulphonedicarboxylic acid + azelaic acid + BPA diacetate | 0.25:0.22:0.03:0.5 | 1.26 | 176 | 210 |
| 7 | TPA + IPA + adipic acid + BPA diacetate | 0.3:0.15:0.05:0.5 | 1.54 | 169 | 205 |
| 8 | TPA + IPA + heptadecanedicarboxylic | 0.3:0.195:0.005: | 1.42 | 171 | 195 |

| Example No. | Composition | Molar ratio | $\eta_{rel}$ | $T_g(°C.)$ | $T_s(°C.)$ |
|---|---|---|---|---|---|
| | acid + BPA diacetate | 0.5 | | | |

DPT = diphenyl terephthalate
DPI = diphenyl isophthlate
BPA = bisphenol A
TPA = terephthalic acid
IPA = isophthalic acid

What is claimed is:

1. A linear thermoplastic copolyester, which has a relative viscosity of at least 1.3, measured on a solution of 1 gram of polyester in 100 ml of a solvent consisting of equal parts of phenol and symmetrical tetracholorethane at 30° C., which comprises the condensation product in about a 1:1 molar ratio of diacids (a) and (c) with bisphenols (b) so that the composition of the polyester comprises in the diacid component of the polyester
(a) from 49.5 to 45 mol %, based on the total polyester, of radicals of at least one aromatic dicarboxylic acid; and
(c) from 0.5 to 5 mol %, based on the total polyester, of radicals of one or more linear or branched aliphatic dicarboxylic acid having 6 to 24 C atoms; and in the bisphenol component of the polyester
(b) 50 mol %, based on the total polyester, of radicals of at least one bisphenol of the formula I

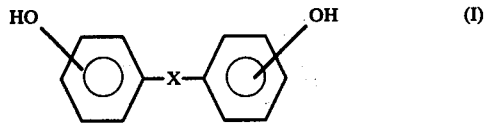

in which the OH groups are bonded in the m-position or p-position and X is a direct bond, O, S, SO$_2$, alkylidene of 2 to 8 carbon atoms, dichloroethylidene, trichloroethylidene, alkylene of 1 to 2 carbon atoms, phenylmethylene, diphenylmethylene, methylphenylmethylene, or cycloalkylidene of 5 to 8 carbon atoms, wherein the radicals (a) and (c) are attached to radicals (b) through ester linkages in a random distribution.

2. A copolyester according to claim 1, which has a relative viscosity of 1.5 to 3.5.

3. A copolyester according to claim 1, wherein the aromatic dicarboxylic acid is terephthalic acid, isophthalic acid or a mixture thereof.

4. A copolyester according to claim 3, which contains, relative to the aromatic dicarboxylic acids, a mixture of 30 to 70 mol % of terephthalic acid and 70 to 30 mol % of isophthalic acid.

5. A copolyester according to claim 1, wherein the OH groups are bonded in the p-position in the bisphenol.

6. A copolyester according to claim 1, wherein X, in formula I, is ethylidene, 1,1- or 2,2-propylidene, butylidene, 1,1-dichloroethylidene, 1,1,1-trichloroethylidene, cyclohexylidene, methylene, ethylene, phenylmethylene, diphenylmethylene or methylphenylmethylene.

7. A copolyester according to claim 6, wherein the bisphenol is 2,2-bis-(p-hydroxyphenyl)-propane or 1,1-bis-(p-hydroxyphenyl)-cyclohexane.

8. A copolyester according to claim 1, wherein the aliphatic dicarboxylic acid contains at least 8 C atoms.

9. A copolyester according to claim 8, wherein the dicarboxylic acid is azelaic acid, sebacic acid, pimelic acid, suberic acid, tetradecanedicarboxylic acid, octadecanedicarboxylic acid, trimethyladipic acid, t-butyladipic acid or an alkylmalonic acid or alkylsuccinic acid having 5 to 20 C atoms in the alkyl group.

10. A copolyester according to claim 9 wherein dicarboxylic acid is an alkylmalonic or alkylsuccinic acid having 8 to 18 C atoms in the alkyl group.

* * * * *